(12) United States Patent
Dufford

(10) Patent No.: US 9,067,593 B2
(45) Date of Patent: Jun. 30, 2015

(54) HYBRID VEHICLE LAUNCH CONTROL

(71) Applicant: Toyota Motor Engineering & Manufacturing North America, Inc., Erlanger, KY (US)

(72) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 321 days.

(21) Appl. No.: 13/791,458

(22) Filed: Mar. 8, 2013

(65) Prior Publication Data

US 2014/0257609 A1    Sep. 11, 2014

(51) Int. Cl.
| | | |
|---|---|---|
| *B60W 20/00* | (2006.01) | |
| *B60W 10/08* | (2006.01) | |
| *B60W 10/02* | (2006.01) | |
| *B60W 10/06* | (2006.01) | |
| *B60W 30/18* | (2012.01) | |

(52) U.S. Cl.
CPC .............. *B60W 20/108* (2013.01); *B60W 10/06* (2013.01); *B60W 10/08* (2013.01); *B60W 2600/00* (2013.01); *Y10S 903/93* (2013.01); *B60W 2720/28* (2013.01); *B60W 30/18027* (2013.01); *B60W 30/18* (2013.01); *B60W 2720/30* (2013.01); *B60W 20/1088* (2013.01); *B60W 2710/0666* (2013.01); *Y02T 10/7077* (2013.01); *Y02T 10/6286* (2013.01); *Y02T 10/6239* (2013.01)

(58) Field of Classification Search
CPC ... B60W 20/108; B60W 10/06; B60W 10/08; B60W 2600/00; B60W 30/18027; B60W 30/18; B60W 20/1088; B60W 2720/28; B60W 2720/30; B60W 2710/0666; B60W 30/18054; B60W 30/18063; Y02T 10/6239; Y02T 10/7077; Y02T 10/6286; Y01S 903/93; Y10T 477/6418; Y10T 477/639
USPC ............ 701/22, 54, 60, 67; 903/930; 477/70, 477/71, 73, 83, 84, 90, 91; 180/65.265, 180/65.275, 65.28
See application file for complete search history.

(56) References Cited

U.S. PATENT DOCUMENTS

| | | | |
|---|---|---|---|
| 4,923,025 A | 5/1990 | Ellers | |
| 5,713,425 A | 2/1998 | Buschhaus et al. | |
| 5,971,092 A | 10/1999 | Walker | |
| 6,217,479 B1 | 4/2001 | Brown et al. | |
| 6,364,807 B1 | 4/2002 | Koneda et al. | |
| 7,220,217 B2 * | 5/2007 | Tamai et al. | .................. 477/183 |
| 7,617,893 B2 | 11/2009 | Syed et al. | |

(Continued)

*Primary Examiner* — Russell Frejd
(74) *Attorney, Agent, or Firm* — Snell & Wilmer LLP

(57) ABSTRACT

A launch control system which maximizes hybrid vehicle acceleration from a standing start. A hybrid vehicle includes wheels, an engine, a motor-generator, a processor, and an actuation device. The processor controls an engine speed and an engine torque independently from a wheel speed and a wheel torque. While the hybrid vehicle is at a standstill, the actuation device is switched to an on state, and the engine speed and engine torque is raised to optimal values. When the actuation device is subsequently switched to an off state, the engine speed and the engine torque is applied to the plurality of wheels to launch the hybrid vehicle. The processor blends or further adjusts the torque applied to the plurality of wheels to maximize the acceleration while optimizing an amount of wheel slip. The processor then learns the launch to improve performance on subsequent launches.

20 Claims, 4 Drawing Sheets

(56) References Cited

U.S. PATENT DOCUMENTS

| | | |
|---|---|---|
| 7,647,994 B1 | 1/2010 | Belloso |
| 7,682,285 B2 | 3/2010 | Kraska et al. |
| 7,841,432 B2 | 11/2010 | Lynn et al. |
| 8,062,172 B2 | 11/2011 | Supina et al. |
| 8,226,513 B2 | 7/2012 | Abe et al. |
| 8,241,176 B2 * | 8/2012 | Soliman et al. ............ 477/21 |
| 8,251,166 B2 | 8/2012 | Holmes et al. |
| 8,825,319 B2 * | 9/2014 | Whitney et al. ............ 701/54 |
| 2011/0068648 A1 | 3/2011 | Ananthakrishna |
| 2011/0077830 A1 * | 3/2011 | Lochocki et al. ............ 701/68 |
| 2011/0306463 A1 | 12/2011 | Tamba et al. |
| 2012/0083978 A1 | 4/2012 | Tajima et al. |
| 2012/0207620 A1 * | 8/2012 | Dalum et al. ............ 417/44.1 |
| 2013/0002210 A1 * | 1/2013 | Gibson et al. ............ 322/7 |
| 2013/0311055 A1 * | 11/2013 | Whitney et al. ............ 701/54 |

\* cited by examiner

HYBRID VEHICLE LAUNCH CONTROL

BACKGROUND

1. Field

The present application relates to a launch control system for hybrid electric vehicles which maximizes vehicle acceleration from a standing start.

2. Description of the Related Art

Sometimes drivers like to launch their vehicles from a standing start. That is, the vehicle's engine is revved to a high speed while minimal torque is applied to the wheels. In conventional vehicles, this maneuver requires applying the brakes while revving the engine in order to hold the vehicle in place while the engine is revved. When the brakes are released, the torque is transferred through a torque converter or clutch to the wheels. Some conventional vehicles have launch control features which assists in performing this maneuver. However, hybrid vehicles cannot utilize the launch control features available in conventional vehicles.

Unlike conventional vehicles, some hybrid vehicles do not use a torque converter or clutch. Rather, these hybrid vehicles employ an electrically controlled variable transmission (ECVT). The ECVT utilizes a planetary gear, motor-generators, and control circuitry to adjust the spin rate of the engine. This allows the ECVT to control the engine speed independent of the vehicle speed. The control logic can provide a counter torque at the wheels to balance out the engine torque. The engine can be revved up while minimizing torque applied to the wheels. Although current hybrid vehicles may allow the engine to rev while keeping the vehicle at a standstill, this feature notifies the driver that the accelerator pedal is pressed and is not configured to launch the vehicle. Other hybrid vehicles may prevent the engine from revving when both the accelerator and brake pedals are applied, as a safety feature. Certain other hybrid vehicles may instead charge the battery when the brake and accelerator pedals are applied concurrently. The control logic, which further includes basic slip control logic, is designed for stability control and traction control. However, there are no launch control features in hybrid vehicles.

Thus, there is a need for a launch control system for hybrid vehicles.

SUMMARY

The present disclosure relates to a hybrid vehicle having a launch control logic. One aspect of the present disclosure is to provide a hybrid vehicle which can be launched from a standing start. Another aspect of the present disclosure is to provide a hybrid vehicle whose engine can be revved to a maximum engine speed while the vehicle is stopped, then launched by applying the engine torque to the wheels.

In one implementation, the launch control system includes a plurality of wheels, an engine, a motor-generator, a processor, and an actuation device. Each of the plurality of wheels has a wheel speed and a wheel torque. The engine has an engine speed and an engine torque. The engine and the motor-generator are configured to provide power to the plurality of wheels. The processor is configured to regulate the engine and the motor-generator to control the engine speed and the engine torque independently from the wheel speed and the wheel torque. When the wheel speed and the wheel torque are substantially 0 and the actuation device is switched to an on state, the engine speed and the engine torque are applied to the plurality of wheels when the actuation device is switched to the off state.

In another implementation, a hybrid vehicle includes a plurality of wheels, an engine, a motor-generator, an accelerator pedal, a brake pedal, and a processor. Each of the plurality of wheels has a wheel speed and a wheel torque. The engine has an engine speed and an engine torque. The engine and the motor-generator are configured to provide power to the plurality of wheels. The processor is configured to regulate the engine and the motor-generator to control the engine speed and the engine torque independently from the wheel speed and the wheel torque. When the wheel speed and the wheel torque are substantially 0 and the brake pedal is in an applied position, the engine speed and the engine torque are applied to the plurality of wheels when the brake pedal is changed to a released position.

In yet another implementation, a method for launching a hybrid vehicle includes receiving an activation signal for a launch control logic, and receiving an on signal for an actuation device. In response to the on signal, an engine speed and an engine torque is controlled independently of a wheel speed and a wheel torque such that the wheel speed and the wheel torque are substantially 0. The engine speed and the engine torque are increased, and an off signal for the actuation device is received. In response to the off signal, the engine speed and the engine torque are applied to the wheels.

BRIEF DESCRIPTION OF THE DRAWINGS

The features, obstacles, and advantages of the present application will become more apparent from the detailed description set forth below when taken in conjunction with the drawings, wherein.

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
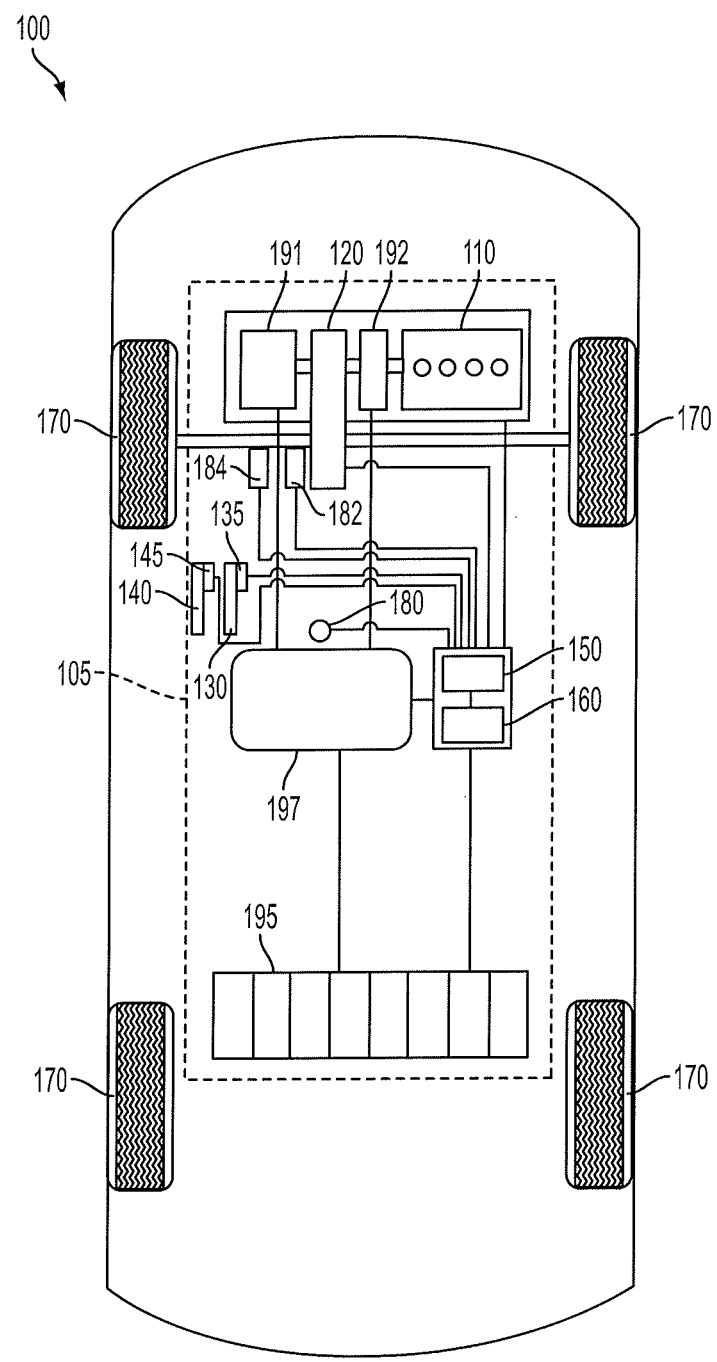
FIG. 1 is a block diagram of a hybrid vehicle including an engine and a motor-generator according to an implementation of the present disclosure.

In one implementation, the present disclosure includes a block diagram of a hybrid vehicle 100 as shown in FIG. 1. The hybrid vehicle 100 can include a drive force unit 105 and wheels 170. The drive force unit 105 further includes an engine 110, an electric motor-generator 191, an electric motor-generator 192, a battery unit 195, an inverter box 197, a brake pedal 140, a brake pedal sensor 145, an accelerator pedal 130, an accelerator pedal sensor 135, a transmission 120, a memory 160, a processor 150, a button 180, a speed sensor 182, and an accelerometer 184.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The accelerator pedal sensor 135 can detect a pressure applied to the accelerator pedal 130 or a position of the accelerator pedal 130, which can adjust the power and torque provided by the engine 110 and/or the motor-generators 191 and 192. The torque output by the engine 110 is received by the transmission 120. The motor-generators 191 and 192 can also output torque to the transmission 120. The engine 110 and the motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The motor-generators 191 and 192 can serve as motors which output torque in a drive mode, and can serve as generators to recharge the battery unit 195 in a regeneration mode. The electric power delivered from or to the motor-generators 191 and 192 passes through inverter box 197 to the battery unit 195. The brake pedal sensor 145 can detect pressure applied to the brake pedal 140 or a position of the brake pedal 140, which may further affect the applied torque to the wheels 170. The speed sensor 182 is connected to an output shaft of the transmission 120 to detect a speed input which is converted into a vehicle speed by the processor 150. The accelerometer 184 is connected to the body of the hybrid vehicle 100 to detect the actual acceleration or deceleration of the hybrid vehicle 100.

The button 180 may be a button on an instrument panel (not shown in FIG. 1) of the hybrid vehicle 100, or may be located elsewhere within the driver's reach, such as on or near a steering wheel, or on the dash. The button 180 may be a switch or other similar device having an on state and an off state, and capable of sending a signal indicating the on or off state. Alternatively, the button 180 may be a touch-sensitive area capable of sending signals which may be interpreted as on or off. The processor 150 may detect a signal from the button 180 to activate a launch control logic.

The transmission 120 is a transmission suitable for a hybrid vehicle. The transmission 120 can be an ECVT, which is coupled to the engine 110 as well as the motor-generators 191 and 192. The transmission 120 can deliver torque output from a combination of the engine 110 and the motor-generators 191 and 192. The processor 150 controls the transmission 120, utilizing data stored in the memory 160 to determine the applied torque delivered to the wheels 170. For example, the processor 150 may determine that at a certain vehicle speed, the engine 110 should provide a fraction of the applied torque to the wheels 170 while the motor-generator 191 provides most of the applied torque. The processor 150 and the transmission 120 can control an engine speed of the engine 110 independently from the vehicle speed.

Figure 2:
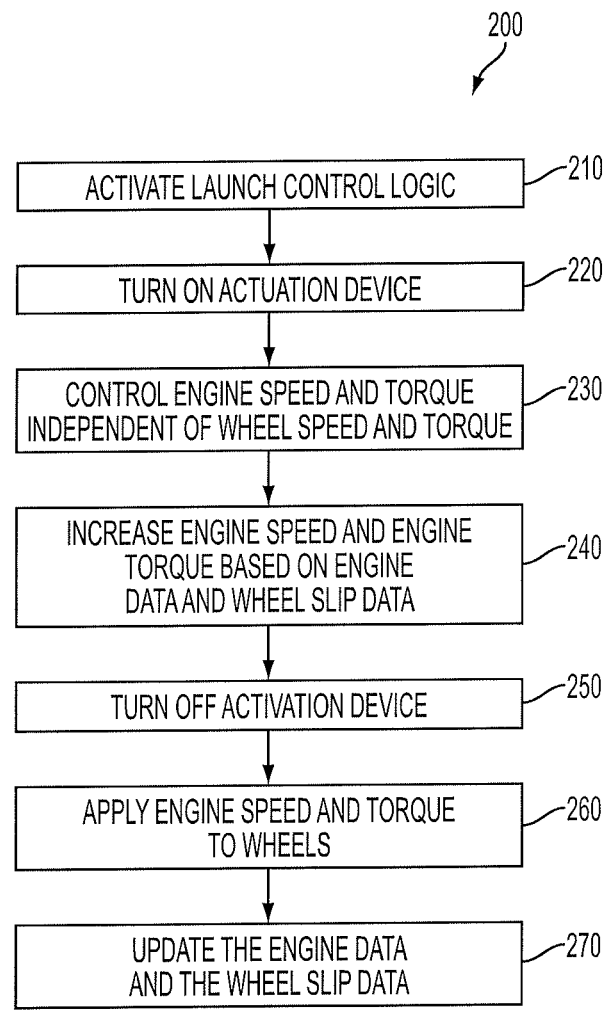
FIG. 2 is a flow chart of a launch control logic according to an implementation of the present disclosure.

FIG. 2 illustrates a flow chart 200 of one implementation of a launch control logic of the processor 150. At 210, the launch control logic is activated. The driver of the hybrid vehicle 100 may push the button 180 to send an activation signal, which is received by the processor 150 to activate the launch control logic. The launch control logic is activated when the hybrid vehicle 100 is stopped. The processor 150 checks the speed sensor 182 for a 0 speed, indicating the hybrid vehicle 100 is stopped. The processor 150 may also check the accelerometer 184 for a 0 acceleration, which also indicates that the hybrid vehicle 100 is stopped. In other implementations, the driver may activate the launch control logic through other means, such as a lever, switch, audio command, or through a user interface within the hybrid vehicle 100. The launch control logic may be activated through one or more means. Alternatively, the launch control logic may be automatically activated. For example, the processor 150 and the memory 160 may determine that certain conditions, which may be previously set by the driver or determined heuristically, are met and accordingly prompt automatic activation of the launch control logic.

At 220, the actuation device is turned on. The actuation device sends an on signal to the processor 150 to indicate it is in an on state. In one implementation, the actuation device may be the brake pedal 140. The driver applies pressure to the brake pedal 140 such that the actuation device is in the on state while the brake pedal 140 is applied. The on signal may be continuous as the actuation device is applied, or may be a discrete signal which is updated when the actuation device is no longer applied. In certain implementations, rather than determining a binary on/off state of the actuation device, the processor 150 may detect degrees of actuation. For example, the brake pedal 140, when fully applied, may indicate to the processor 150 to expect a maximum acceleration launch. The brake pedal 140, when a reduced pressure is applied, may indicate to the processor 150 to expect a shorter or otherwise reduced acceleration launch.

In alternative implementations, the actuation device may also send the activation signal for the launch control logic. The button 180 may activate the launch control logic when initially pushed, and when held down, may also indicate the on state for the actuation device. The driver then pushes and holds down the button 180 to both activate the launch control logic and turn on the actuation device. In certain implementations, the button 180 also sends a brake signal, such that the driver need only hold down the button 180 without simultaneously holding down the brake pedal 140. The button 180 may be configured to send the brake signal only when the launch control logic is active.

The actuation device may further be implemented through more than one means. For instance, the button 180 and the brake pedal 140 may both be configured to send the activation signal. The driver may then use the button 180 to indicate the on state. The driver may then apply the brake pedal 140 while releasing the button 180, but still maintain the on state, to give the driver multiple options for controlling the launch control logic.

At 230, the engine speed and the engine torque are controlled independent of the wheel speed and the wheel torque. The processor 150 can prevent or counter torque from being applied to the wheels 170. The torque from the engine 110 may be countered by a counter torque from the motor-generator 191 or 192. However, due to the planetary gear configuration, there may still be a torque at the wheels 170. By requiring the driver to hold down the brake pedal 140, the hybrid vehicle 100 remains stationary. In certain implementations, the brake pedal 140 also acts as the actuation device, as described above. In other implementations, the button 180 sends the brake signal so that the driver does not have to hold down the brake pedal 140.

At 240, the engine speed and the engine torque are increased based on the engine data and the wheel slip data. The driver can increase the engine speed and the torque by applying pressure on or to the accelerator pedal 130. The increase in the engine speed and the torque may correspond to the position of the accelerator pedal 130. Fully applying the accelerator pedal 130 raises the engine speed to a maximum engine speed, which also indicates to the processor 150 to apply a maximum acceleration. With the launch control logic activated, the engine speed may be higher than a maximum available engine speed when the launch control logic is disabled. Because the engine speed and the torque can be controlled independent of the wheel speed and the torque, the driver can apply the accelerator pedal 130 to rev the engine 110 without moving the hybrid vehicle 100. This allows the driver to rev the engine 110 to a higher engine torque and speed than normally available when the hybrid vehicle 100 is not moving. This further allows the driver to hold the engine 110 at a higher engine torque and speed than normally available when the hybrid vehicle 100 is not moving.

In a normal acceleration from a standing start, the inertia required to initially rev up an engine takes power away from the wheels. A hybrid vehicle can utilize an electric motor for the initial launch, but the electric motor provides much less power than the engine. Advantageously, the hybrid vehicle 100 can rev up the engine 110 before the launch in order to deliver full power without waiting for the engine 110. Since the motor-generator 191 or 192 does not have to substitute for the engine 110, the motor-generator 191 or 192 can also deliver full power.

Because the driver has selected the launch control, the processor 150 can determine that if the accelerator pedal 130 is sufficiently pressed, the processor 150 should apply the maximum acceleration. In other words, if the driver applies enough pressure to meet or exceed a pedal threshold, the processor 150 will apply the maximum acceleration even if the driver did not fully apply the accelerator pedal 130. The pedal threshold may be 50%, 90% or another suitable threshold. The threshold may depend on safety concerns. In addition, the threshold may be chosen to allow a smooth transition back to normal accelerator pedal control.

The memory 160 holds the engine data and the wheel slip data. The engine data includes data regarding previous launches, including engine speeds and torques used and results based on feedback from the speed sensor 182 and the accelerometer 184. The wheel slip data includes data based on feedback from a slip control logic or a traction control logic. Storing performance and wheel slip feedback data from previous launches allows the launch control logic to learn launching parameters and characteristics. By analyzing the engine data, the processor 150 can determine an optimal engine speed and torque for maximum acceleration. When available, the processor 150 can take into account other parameters, such as temperature, altitude, or grade, to further optimize the engine torque.

Based on the engine data, the processor 150 can determine an optimal engine speed. The optimal engine speed may not be a maximum engine speed, or may not correspond to the engine speed requested by the driver through the accelerator pedal 130. Once the driver presses the accelerator pedal 130 beyond the pedal threshold, the processor 150 can override the driver's requested engine speed to instead apply the optimal engine speed. In alternative implementations, the driver may be presented a choice between manual engine speed control or automatic engine speed control.

If there is too much wheel slip, then at launch, the wheels 170 will spin fast without traction, which does not move the hybrid vehicle 100 and instead wears out the tires of the wheels 170. However, a small amount of wheel slip may be favorable, as it can allow for improved acceleration. The wheel slip data includes how much wheel slip occurs for various parameters, such as engine speed and torque. The processor 150 can then optimize the amount of wheel slip for maximum acceleration.

At 250, the activation device is turned off. Releasing the actuation device signals the off state to the processor 150. The off signal may be sent as a second "off" signal, or may be signaled by the absence of a continuing "on" signal. In certain implementations, the driver may release the brake pedal 140 and/or the button 180 to indicate the off state.

At 260, in response to the actuation device turning off, the processor 150 applies the engine speed and the torque to the wheels 170. The engine speed and the torque may be the optimized engine speed and torque, or may be a requested engine speed and torque from the driver. The processor 150 may utilize additional logic to maximize the acceleration from a standing start. The power from the engine 110 and the motor-generators 191 and 192 to the wheels 170 is blended. The processor 150 may also read the accelerometer 184 to determine how much torque to apply to the wheels 170. If too much torque is applied at once, the wheels 170 may spin, but the hybrid vehicle 100 will not move because the wheels 170 would slip. Rather than applying the torque at once, the torque may be ramped up to keep the hybrid vehicle 100 accelerating as fast as possible.

At 270, the engine data and the wheel slip data are updated. The processor 150 stores the engine data and the wheel slip data in the memory 160. In other implementations, the engine data and/or the wheel slip data may be stored in another on-board memory, or an external memory. The external memory may also be wirelessly connected to the processor 150. In addition, other performance metrics and results may be stored, for the processor 150 to better optimize subsequent launches or to provide the driver with results.

Figure 3A:
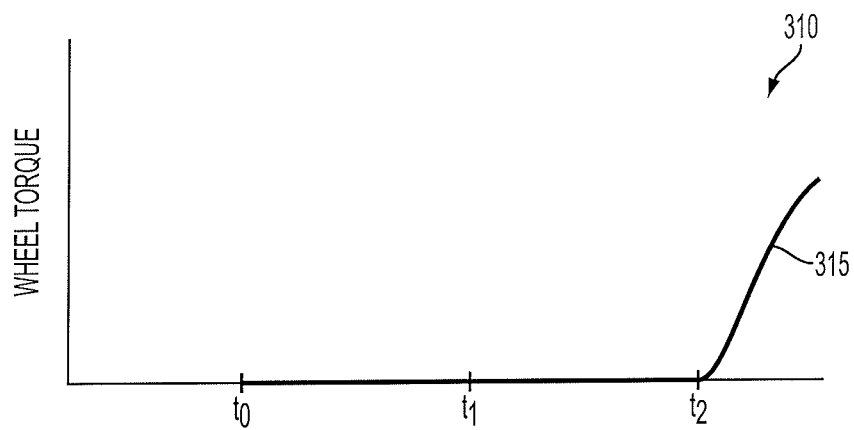
FIGS. 3A-C are graphs depicting the wheel torque, engine torque, and brake pressure of the launch control system over time according to an implementation of the present disclosure.
Figure 3B:
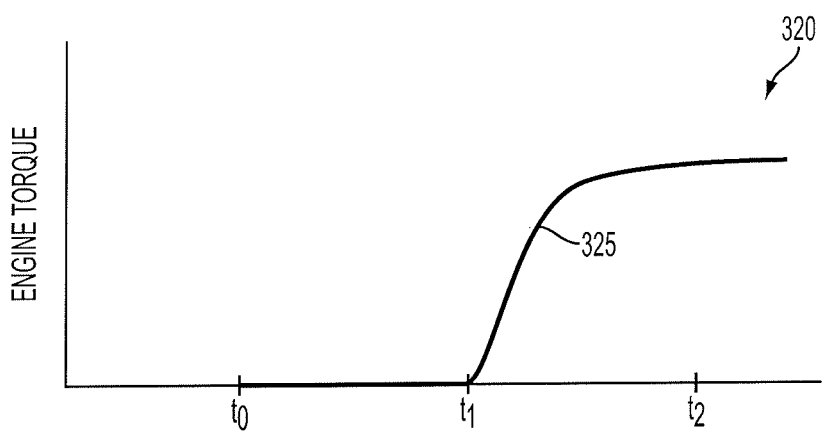
Figure 3C:
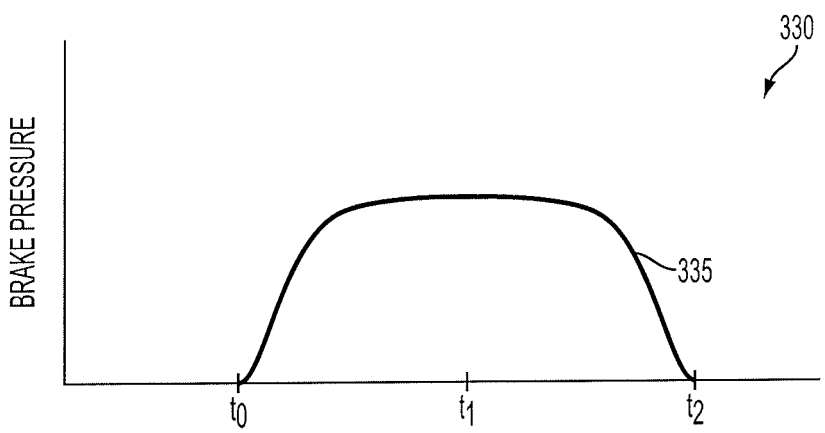

FIGS. 3A-C present graphs of the wheel torque (FIG. 3A), engine torque (FIG. 3B), and brake pressure (FIG. 3C) as the launch control logic is activated. In plot 310 of FIG. 3A, the wheel torque curve 315 illustrates a wheel torque over time. In plot 320 of FIG. 3B, the engine torque curve 325 illustrates an engine torque over time. In plot 330 of FIG. 3C, the brake pressure curve 335 illustrates a brake pressure over time. The plots represent approximate representations to show the relationship between the wheel torque, the engine torque, and the brake pressure, rather than exact values. Further, the plots do not necessarily represent or resemble actual curves that may be measured from bench testing.

At time $t_0$, the launch control logic is activated, and the actuation device, e.g. brake pedal 140, is applied as seen by the brake pressure curve 335. The wheel torque at time $t_0$ is substantially 0 as the hybrid vehicle 100 is at a standstill, as seen by the wheel torque curve 315. The engine torque at time $t_0$ is minimal because the engine 110 has not been revved, as seen by the engine torque curve 325.

At time $t_1$, the actuation device is in the on state, allowing the engine torque and speed to be increased without being applied to the wheels 170. The engine torque rises as the driver applies the accelerator pedal 130. The engine 110 may be revved up to a high speed and kept at a high speed until the driver is ready to launch the hybrid vehicle 100. For maximum acceleration, the engine 110 may be revved up to a maximum engine speed, or an optimal engine speed if available. The wheel torque remains substantially 0 as it is controlled independent from the engine torque.

At time $t_2$, the brake pedal 140 is fully released to launch the hybrid vehicle 100. The engine torque may remain relatively constant as the driver has not released the accelerator pedal 130. However, the wheel torque is dramatically increased, as the engine torque and the speed are applied to the wheels 170. The engine torque may be blended with the motor-generator torque to maximize acceleration.

As a safety precaution, the launch control logic may prevent the hybrid vehicle 100 from launching if there is any brake pedal pressure. As another safety precaution, the launch control logic may limit the length of time the driver can hold the engine 110 at the high engine speed. The launch control logic may then cancel the launch, or may automatically reduce the engine speed.

Figure 4:
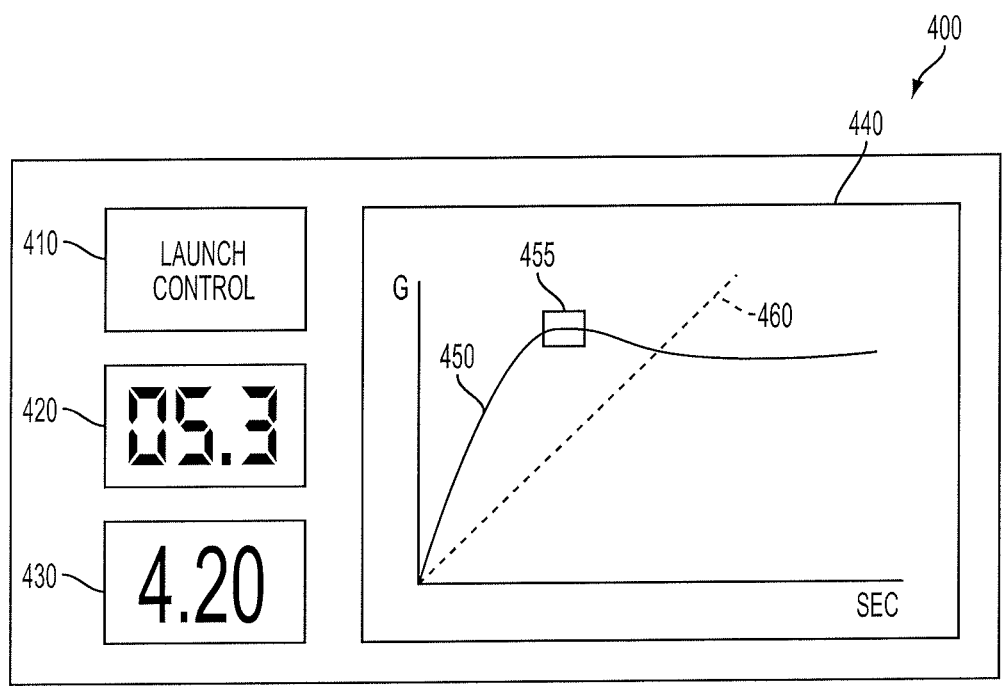
FIG. 4 is a console display showing launch results according to an implementation of the present disclosure.

FIG. 4 illustrates a screen 400 viewed by the driver of the hybrid vehicle 100. The screen 400 may be displayed on a normal console display, or may otherwise be made visible to the driver while driving. The screen 400 may be always available to the driver, or may be accessible through an interface. The screen 400 displays a launch result summary to the driver through an interface. In FIG. 4, the interface is a touch screen, but may also include physical buttons in other implementations.

A launch control indicator 410 indicates that the hybrid vehicle 100 is in a launch control mode, with the launch control logic activated. The launch control indicator 410 may light up when the button 180 is pushed. The launch control indicator 410 dims when the launch control logic is inactive or canceled. Although the launch control indicator 410 is represented by the text "LAUNCH CONTROL," in alternative embodiments, the launch control indicator 410 may be different text, such as "LC," or may be a graphical icon. In certain implementations, the button 180 may be the launch control indicator 410.

A stopwatch 420 measures a time of the launch. The stopwatch 420 may start when the activation device is turned off, and stop when a condition occurs. The condition may be a target speed, such as 60 mph, which may also be selectable by the driver. For example, the driver may release the button 180, starting the stopwatch 420. The stopwatch 420 runs until the hybrid vehicle 100 reaches 60 mph, at which point the stopwatch 420 stops and displays the 0-60 time. In FIG. 4, the stopwatch 420 is a digital display in seconds. In other implementations, the stopwatch 420 may be presented in another fashion, such as an analog clock with hands. The driver may also select the precision displayed by the stopwatch 420.

A best time display 430 shows the fastest time measured by the stopwatch 420. The driver can compare his current launch time with his previous best time. In FIG. 4, the hybrid vehicle 100 has a 5.3 second 0-60 time, but has a best time of 4.2 seconds. The memory 160 may store a single best time, or multiple best times for each stopwatch condition, such as 0-60, 0-80, 0-100, etc. Alternatively, the best time display 430 may instead show the time from the most recent launch. By seeing both times, the driver can better determine which parameters to change to increase performance.

An acceleration chart 440 displays the acceleration of the hybrid vehicle 100, which may be measured by the accelerometer 184. Specifically, a G curve 450 displays the G's felt over time during the launch. A peak G indicator 455 denotes the peak G experienced during the launch. A speed curve 460 displays a vehicle speed of the hybrid vehicle 100 during the launch.

The driver is presented with a launch result summary that allows the driver to further tweak launch parameters. Although FIG. 4 presents one possible launch result summary, the driver may customize the display, by rearranging elements and adding or removing elements. The interface may further allow the driver to view other historic launch data stored in the memory 160 or other memory, including the engine data and the wheel slip data.

Rather than tweaking launch parameters, the driver may be interested in seeing the learning progression of the launch control logic. By viewing the launch result summary, the driver can see how the launch control logic has learned and improved launches over time. The launch result summary may also be exported to be viewed and analyzed outside of the hybrid vehicle 100.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A launch control system for launching a hybrid vehicle comprising:

a plurality of wheels having a wheel speed and a wheel torque;

an engine having an engine speed and an engine torque and configured to provide power to the plurality of wheels;

a motor-generator configured to provide power to the plurality of wheels;

a memory configured to store engine data and wheel slip data;

a processor configured to regulate the engine and the motor-generator to control the engine speed and the engine torque independently from the wheel speed and the wheel torque; and an actuation device having an on state and an off state, wherein the wheel speed and the wheel torque are substantially 0 during the on state, and the engine speed and the engine torque are applied to the plurality of wheels based on the engine data and the wheel slip data when the actuation device is switched from the on state to the off state.

2. The launch control system of claim 1, wherein the processor is further configured to blend the power from the engine and the power from the motor-generator to the plurality of wheels when the actuation device is switched from the on state to the off state to maximize an acceleration of the hybrid vehicle.

3. The launch control system of claim 1, wherein the engine speed that is applied to the plurality of wheels when the actuation device is in the on state is higher than a maximum available engine speed when the hybrid vehicle is stopped and the actuation device is in the off state.

4. The launch control system of claim 1, further comprising an accelerator pedal and an accelerator pedal sensor configured to detect a position of the accelerator pedal, wherein the engine speed and the engine torque corresponds to the position of the accelerator pedal.

5. The launch control system of claim 1, further comprising an accelerator pedal and an accelerator pedal sensor configured to detect a position of the accelerator pedal, wherein the processor applies the engine speed and the engine torque when the accelerator pedal is pressed beyond a pedal threshold.

6. The launch control system of claim 1, wherein the actuation device comprises a button.

7. The launch control system of claim 6, wherein the button is configured to send a brake signal.

8. A hybrid vehicle comprising:
a plurality of wheels having a wheel speed and a wheel torque;
an engine having an engine speed and an engine torque and configured to provide power to the plurality of wheels;
a motor-generator configured to provide power to the plurality of wheels;
an accelerator pedal;
an accelerator pedal sensor configured to detect an accelerator pedal position, wherein the accelerator pedal position controls the engine speed and the engine torque;
a brake pedal;
a brake pedal sensor configured to detect a brake pedal position;
a memory configured to store engine data and wheel slip data; and
a processor configured to regulate the engine and the motor-generator to control the engine speed and the engine torque independently from the wheel speed and the wheel torque,
wherein the engine speed and the engine torque are not applied to the plurality of wheels when the brake pedal is in an applied position such that the wheel speed and the wheel torque are substantially 0 when the brake pedal is in the applied position, and the engine speed and the engine torque are applied to the plurality of wheels based on the engine data and wheel slip data when the brake pedal is changed from the applied position to a released position in order to perform a launch of the hybrid vehicle.

9. The hybrid vehicle of claim 8, further comprising a display configured to display a launch result summary of the launch.

10. The hybrid vehicle of claim 8, wherein the engine speed that is applied to the plurality of wheels when the brake pedal is in the applied position is higher than a maximum available engine speed when the hybrid vehicle is stopped and the brake pedal is in the released position.

11. The hybrid vehicle of claim 8, wherein the processor is further configured to adjust the engine speed and the engine torque applied to the plurality of wheels to optimize a wheel slip.

12. The hybrid vehicle of claim 8, further comprising an accelerometer for detecting an acceleration of the hybrid vehicle, wherein the processor is further configured to control the engine speed and the engine torque applied to the plurality of wheels based on the acceleration.

13. The hybrid vehicle of claim 8, further comprising a speed sensor for detecting a speed of the hybrid vehicle, wherein the processor is further configured to control the engine speed and the engine torque applied to the plurality of wheels based on the speed.

14. The hybrid vehicle of claim 8, further comprising a button configured to send a signal to the processor to activate a launch control logic.

15. A method to launch a hybrid vehicle comprising:
receiving an activation signal for a launch control logic;
receiving an on signal for an actuation device;
in response to the on signal, controlling an engine speed and an engine torque of an engine independently of a wheel speed and a wheel torque of a plurality of wheels such that the wheel speed and the wheel torque are substantially 0, the engine speed and the engine torque controlled based on engine data and wheel slip data;
increasing the engine speed and the engine torque;
receiving an off signal for the actuation device;
in response to the off signal, applying the engine speed and the engine torque to the plurality of wheels based on the engine data and the wheel slip data to perform a launch; and
updating the engine data and the wheel slip data.

16. The method of claim 15, wherein the increasing the engine speed increases the engine speed higher than a maximum available engine speed when the hybrid vehicle is stopped and the launch control logic is inactive.

17. The method of claim 15, wherein the applying the engine speed and the engine torque to the plurality of wheels further comprises optimizing a wheel slip.

18. The method of claim 15, further comprising holding the hybrid vehicle to a stop prior to the receiving the off signal.

19. The method of claim 15, wherein the receiving the activation signal and the receiving the on signal occurs substantially concurrently.

20. The method of claim 15, wherein the updating the engine data and the wheel slip data further comprises storing launch performance data to maximize acceleration in subsequent launches.

* * * * *